Sept. 18, 1973    R. L. HAWLEY    3,759,721

METHOD OF HEATING A PACKAGED FOODSTUFF IN A TOASTER

Filed Sept. 30, 1971

INVENTOR
ROBERT L. HAWLEY
BY

*Lawrence J. Hurst*

ATTORNEY

United States Patent Office 3,759,721
Patented Sept. 18, 1973

3,759,721
METHOD OF HEATING A PACKAGED FOODSTUFF IN A TOASTER
Robert Lyle Hawley, Webster Groves, Mo., assignor to Ralston Purina Company, St. Louis, Mo.
Continuation-in-part of abandoned application Ser. No. 858,684, Sept. 17, 1969. This application Sept. 30, 1971, Ser. No. 185,129
Int. Cl. B65b 25/22
U.S. Cl. 99—171 H          2 Claims

ABSTRACT OF THE DISCLOSURE

Non-metallic, sorbent material is utilized in forming an envelope surrounding a prepared food product which is to be heated before consumption. The package may be moistened with water, and placed in a toaster which will permit heating or reconstitution of the food product without incineration of the sorbent material.

BACKGROUND OF THE INVENTION

This application is a continuation-in-part of my co-pending application Ser. No. 858,684, filed Sept. 17, 1969, now abandoned.

The present invention is concerned with providing a package suitable for holding a prepared food item which is inserted into a toaster preparatory to consumption of the food item. Primarily, such reconstitutable food items, generally designated as prepared foods capable of being consumed upon heating, include such items as prefried bacon, sausage, omelets, pancakes, and the like.

It is well known in the art to package such reconstitutable food items in a metal foil or metal foil laminated package suitable for insertion and reconstitution or heating in a toaster. However, one of the principal disadvantages to utilizing metal foil is that the foil packages are relatively expensive. Other disadvantages are that special construction of these metal foil packages is required to permit the escape of steam from such packages or to accommodate the juices from the foods being reconstituted in such packages.

The present invention discloses a novel method of packaging food products such that with little effort the food product may be reconstituted, such as by heating in a toaster. By packaging food products in an envelope of sorbent material, a relatively cheap means for distributing reconstitutable food items is provided which is suitable for home or institution use. The food package of sorbent material when moistened may be placed in a toaster to permit the food item to be heated or reconstituted. The moistening of the sorbent material is sufficient to prevent it from being incinerated during heating in the toaster and yet the sorbent material permits the ready heat penetration to the food product contained in the package.

SUMMARY OF THE INVENTION

It is, therefore, a general object of the present invention to provide a relatively cheap package for a food product to be heated or reconstituted and which may be utilized in preparing such food products in a toaster.

Still another object of the present invention is to provide a relatively cheap food package which requires little preparation before utilization in heating or reconstituting food products.

These and other objects and advantages of the present invention will become more apparent with the description hereinafter.

Briefly, the present invention comprises a method of heating or reconstituting foods in a toaster and a package for same wherein the package consists of sorbent material completely enclosing a food product and the package is utilized by moistening the package sufficiently to prevent incineration of the package, allowing any excess water to drip off the package and thereafter inserting the package into a toaster to reconstitute the food product. Further, the package and method disclosed herein may be utilized without harm or danger to either the toaster or the person using the package.

BRIEF DESCRIPTION OF THE DRAWINGS

In the accompanying drawings which form a part of this specification and wherein like numerals refer to like parts wherever they occur.

DESCRIPTION OF THE PREFERRED EMBODIMENTS

Figure 1:
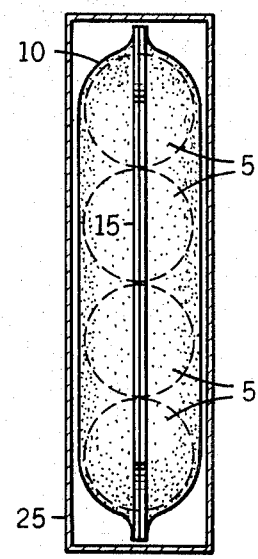
FIG. 1 is a partially broken away view of the package of the present invention having a reconstitutable food therein.
Figure 2:
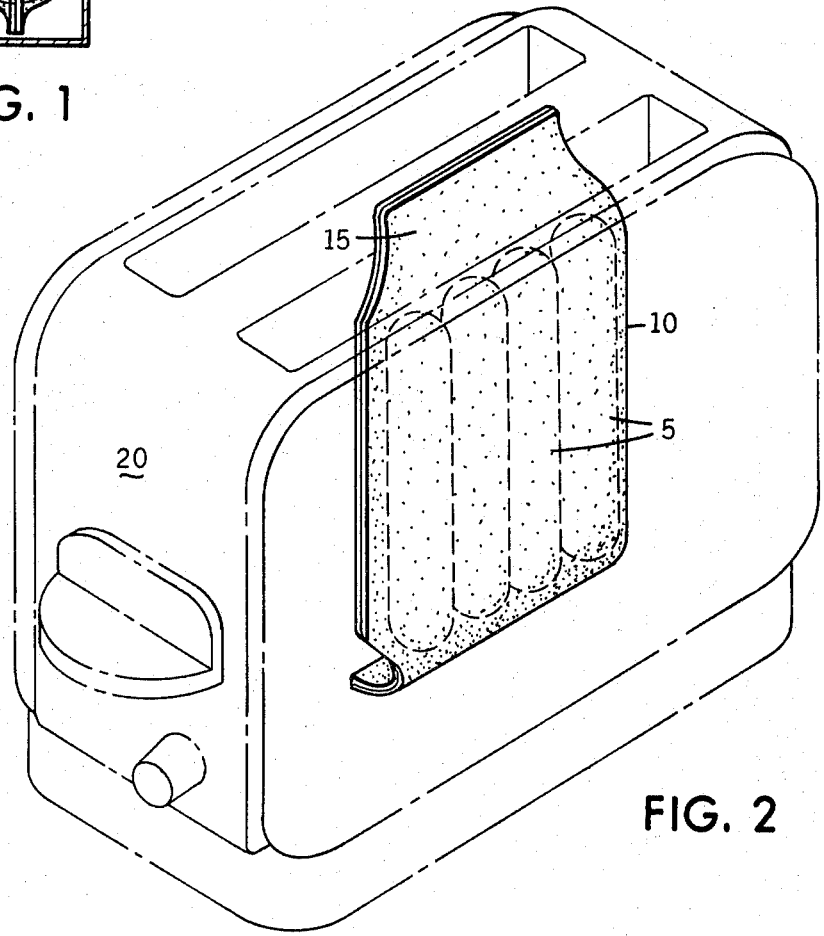
FIG. 2 is a perspective view of a conventional toaster having the package of FIG. 1 disposed therein.

In an effort to provide food items which may be heated prior to consumption as economically as possible, it has been discovered that by forming an envelope which completely enclosed such food items within sorbent material, satisfactory results could be obtained. Primarily utilized in practicing the present invention is a highly sorbent paper. Preferably, porous paper material or woven paper fiber material, such as used for a wet-strength paper towel, will be utilized in carrying out the present invention although other similar wet-strength sorbent materials may be utilized. The price difference between such wet-strength sorbent materials and metal foils suitable for packaging reconstitutable food items is readily apparent. Referring now to FIGS. 1 and 2, the food item to be heated or reconstituted 5 is enclosed in a sorbent wet-strength envelope 10. The reconstitutable food items illustrated are prefried sausages, although other food items which have previously been prepared and which are capable of being consumed upon heating, such as prefried bacon, omelets and pancakes, to name only a few, may be utilized. The preparation of these food items for reconstitution or heating is well known in the art.

The envelope 10 should be of a size such that it will conveniently fit into the opening of a standard toaster and preferably will be of sufficient length that a portion 15 thereof will extend beyond the heating chambers of the toaster 20. The portion 15 permits the ready insertion and removal of the package 10 from the toaster 20. Glue or any other well known binder material may be used to seal the sorbent material to form the envelope 10 for retaining the reconstitutable food product 5 therein. Since the wet-strength sorbent material does not function as a protective device for the food product, it is preferred that an outer envelope or package 25 be formed about the sorbent material. The outer envelope or package 25 may consist of any suitable impervious material, such as a protective box or a heat sealable plastic film, both of which are well known in the art. Such food products, after being enclosed in the sorbent material envelope 10 and subsequently sealed in the impervious material package 25, would then be refrigerated or frozen for subsequent distribution and use by a consumer.

In preparation of the food product 5, the package 25 is removed from the refrigerator or freezer, the outer impervious material package 25 removed and the wet-strength sorbent envelope 10 moistened with water. This wetting or moistening of the envelope 10 may be done either by submersion in a pan of water or by passing the package under a running faucet and should be for a sufficient period that the water sorbent envelope 10 absorbs or adsorbs a sufficient quantity of water to prevent incineration of the package when it is placed in the toaster and heated. Preferably the quantity of water adsorbed or adsorbed by the envelope 10 will be substantially to the limit of its water sorption capacity. Ideally the envelope 10 will consist of wet-strength sorbent material capable of sorbing water substantially to the limit of its water sorption capacity very rapidly. It should be understood that the quantity of water sorbed by the package need not necessarily be its maximum capacity, but rather a quantity of water sufficient to permit the desired heating of the food and be effective to prevent incineration or charring of the package. It is desirable that this sorption occur as rapidly as possible so that prolonged periods of time are not required to moisten or wet the envelope 10. The selection of the material for the envelope 10 will depend on the operator's preference, but preferably will be a material which sorbs water rapidly and which when moistened will have sorbed an amount of moisture which will be effective to prevent the package from being incinerated when heated in a toaster.

The moistened or wet envelope 10 is then held or retained for a sufficient period of time to allow any excess water on the package to drain or drip off. The package in its damp or moist condition is then inserted in the heating chamber of the toaster 20 and subjected to heat for a sufficient period of time to reconstitute or heat the food item 5. A standard setting on the toaster is normally sufficient for reconstitution of the food item 5. The moisture sorbed by the envelope 10 provides an evaporative cooling effect dudring the heating of the food to prevent incineration of the envelope 10. In addition, the wet-strength sorbent material of the envelope 10 does not interfere with the heat transfer from the heating chamber of the toaster 20 to the reconstituable food 5. Upon completion of the heat cycle in the toaster, the envelope 10 may then be torn open and the heated food 5 is ready for As an alternative, the package 10 containing the reconstitutable food item 5 may be moistened to the desired degree and frozen prior to the insertion thereof into the outer package 25 or it may be moistened to the desired degree, placed in the outer package and then frozen. As is obvious, the desired degree of moistening of the package 10 would be determined by the type of food contained therein and the type of wet-strength sorbent material utilized in preparing the package and would be an amount which would be effective to prevent incineration of the package and allow the food item to be heated. Thus, when it is desired to heat or reconstitute the food item 5 it would only be necessary to remove the outer package 25 and insert the package 10 while in the frozen condition into the toaster to heat or reconstitute the food item 5. The previously moistened envelope being effective to pevent incineration of the package during the heating thereof.

From the foregoing, it is now apparent that a novel food package for reconstituting food items in a toaster and method of using same, meeting the objects set out hereinbefore as provided and that changes or modifications as to the precise configurations, shapes and retails set forth in the disclosure by way of illustration may be made by those skilled in the art without departing from the spirit of the invention, as defined by the claims which follow.

I claim:

1. The method of heating in a toaster a prepared food product which has been enclosed in a non-metallic wet-strength sorbent material envelope and a second envelope of an impervious material comprising the steps of: removing the impervious material envelope from about the non-metallic wet-strength sorbent material envelope, applying a sufficient amount of water to said sorbent envelope substantially to the limit of the water sorption capacity such that during the heating the evaporative cooling effect obtained prevents incineration thereof, removing any excess water from said sorbent envelope and heating the moistened sorbent envelope in a toaster for a sufficient period of time to heat the food product for consumption.

2. The method of heating in a toaster a prepared food product which has been enclosed in a moistened non-metallic wet-strength sorbent material envelope, then enclosed in a second envelope of an impervious material and then frozen comprising the steps of: removing the impervious material envelope from about the frozen moistened wet-strength sorbent material envelope, placing the envelope in a toaster while still in the frozen condition and heating the moistened envelope in the toaster for a sufficient period of time to heat the food product for consumption while the moisture in the envelope serves to prevent incineration of said envelope during the heating thereof.

References Cited

UNITED STATES PATENTS

| 3,395,025 | 7/1968 | Hermanson | 99—171 H |
| 3,689,291 | 9/1972 | Draper | 99—171 (H)X |
| 1,711,372 | 4/1929 | Carter | 99—174 |
| 3,322,319 | 5/1967 | Sweeney et al. | 99—171 H |
| 3,585,048 | 6/1971 | Uhlig et al. | 99—174 |
| 3,361,576 | 1/1968 | Jacobson | 99—174 X |

FOREIGN PATENTS

| 482,583 | 4/1952 | Canada | 99—171 H |

FRANK W. LUTTER, Primary Examiner

S. L. WEINSTEIN, Assistant Examiner

U.S. Cl. X.R.

99—171 PP, 174

UNITED STATES PATENT OFFICE
CERTIFICATE OF CORRECTION

Patent No. 3,759,721      Dated September 18, 1973

Inventor(s)   Robert Lyle Hawley

It is certified that error appears in the above-identified patent and that said Letters Patent are hereby corrected as shown below:

Column 3, line 4, the first "adsorbed" should read "absorbed".

Column 3, line 31, "dudring" should read "during".

Column 3, line 37, after "for" insert "consumption."

Column 4, line 5, "retails" should read "details"

Signed and sealed this 30th day of July 1974.

(SEAL)
Attest:

McCOY M. GIBSON, JR.
Attesting Officer

C. MARSHALL DANN
Commissioner of Patents